(12) United States Patent
Ajichi

(10) Patent No.: US 9,105,223 B2
(45) Date of Patent: Aug. 11, 2015

(54) DISPLAY DEVICE AND DISPLAY METHOD

(75) Inventor: Yuhsaku Ajichi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 118 days.

(21) Appl. No.: 13/984,621

(22) PCT Filed: Feb. 8, 2012

(86) PCT No.: PCT/JP2012/052814
§ 371 (c)(1),
(2), (4) Date: Aug. 9, 2013

(87) PCT Pub. No.: WO2012/111496
PCT Pub. Date: Aug. 23, 2012

(65) Prior Publication Data
US 2013/0321247 A1    Dec. 5, 2013

(30) Foreign Application Priority Data

Feb. 15, 2011  (JP) .................................. 2011-029555

(51) Int. Cl.
*G09G 3/20*   (2006.01)
*G09G 5/14*   (2006.01)
*G02B 27/26*  (2006.01)
(Continued)

(52) U.S. Cl.
CPC  *G09G 5/14* (2013.01); *G02B 27/26* (2013.01); *G02F 1/133512* (2013.01); *G03B 35/24* (2013.01); *H04N 13/0422* (2013.01); *H04N 13/0434* (2013.01)

(58) Field of Classification Search
CPC ....... G09G 3/003; G09G 3/3406; G09G 5/14; G09G 2320/0209; G09G 2320/0214; G09G 2320/028

USPC .............................................. 345/55, 83–100
See application file for complete search history.

(56) References Cited

U.S. PATENT DOCUMENTS 8,421,709 B2 * 4/2013 Kang ................................ 345/6
8,760,369 B2 * 6/2014 Nakahata ......................... 345/32
(Continued)

FOREIGN PATENT DOCUMENTS

JP  2008-257207 A  10/2008
JP  2008-281605 A  11/2008
(Continued)

OTHER PUBLICATIONS

International Search Report PCT/ISA/210 for PCT/JP2012/052814 dated Mar. 27, 2012.
(Continued)

*Primary Examiner* — Vijay Shankar
(74) *Attorney, Agent, or Firm* — Harness, Dickey & Pierce, P.L.C.

(57) ABSTRACT

Provided is a display device and a display method for the display device with which a three-dimensional stereoscopic image with reduced crosstalk and a two-dimensional planar image with high brightness can be displayed. In a display device that is capable of displaying an stereoscopic image by displaying an image for the right eye and an image for the left eye, pixel lines for the right eye for displaying the image for the right eye and pixel lines for the right eye for displaying the image for the left eye are alternately arranged in the vertical direction with black pixel lines for displaying a black image therebetween.

8 Claims, 4 Drawing Sheets

(51) Int. Cl.
  *G02F 1/1335* (2006.01)
  *G03B 35/24* (2006.01)
  *H04N 13/04* (2006.01)

(56) References Cited

U.S. PATENT DOCUMENTS

2008/0239485 A1 10/2008 Kuroda et al.
2010/0225682 A1 9/2010 Nakahata
2010/0265230 A1 10/2010 Kang

FOREIGN PATENT DOCUMENTS

JP 2010-204389 A 9/2010
JP 2010-250257 A 11/2010

OTHER PUBLICATIONS

Written Opinion PCT/ISA/237 for PCT/JP2012/052814 dated Mar. 27, 2012.

* cited by examiner

DISPLAY DEVICE AND DISPLAY METHOD

TECHNICAL FIELD

The present invention relates to a display device for displaying a three-dimensional stereoscopic image and a display method for the display device. In particular, the present invention relates to a display device for displaying a two-dimensional planar image and a three-dimensional stereoscopic image and a display method for the display device.

DESCRIPTION OF THE RELATED ART

In recent years, the demand for stereoscopic display devices for displaying a three-dimensional stereoscopic image has been increasing.

Examples of known stereoscopic display devices include a stereoscopic display device illustrated in FIG. 6. FIG. 6 is a schematic view illustrating the structure of the main part of an existing stereoscopic display device.

As illustrated in FIG. 6, a stereoscopic display device 100 includes an image display section 101 and a retarder 102. The image display section 101 includes pixel lines R for the right eye and pixel lines L for the left eye that are alternately arranged in the vertical direction, and displays an image for the right eye and an image for the left eye in different regions. The retarder 102 includes retarders R1 for the right eye and retarders L1 for the left eye that are alternately arranged in the vertical direction so as to face the pixel lines R for the right eye and the pixel lines L for the left eye. The retarder 102 makes the polarization axes of incident image light for the right eye and incident image light for the left eye be perpendicular to each other. The stereoscopic display device 100 provides a viewer with parallax images. A viewer can experience stereoscopic vision because different parallax images enter the left and right eyes of the viewer.

However, the stereoscopic display device 100 illustrated in FIG. 6 has the following problem. When the stereoscopic display device 100 is viewed at an angle from the front side, a part of image light for the right eye generated in the image display section 101 (for example, arrow a in FIG. 6) passes through one of the retarders L1 for the left eye and reaches the left eye of a viewer and a part of image light for the left eye passes through one of the retarders R1 for the right eye and reaches the right eye of the viewer. As a result, crosstalk occurs.

This crosstalk occurs for the following reason. The image display section 101 has a glass substrate 103 or the like, which is disposed between the pixel lines R and L and the retarder 102, so that there is a certain distance between the pixel lines R and L and the retarder 102. Due to the distance, a part of light emitted from the pixel line R for the right eye passes through an adjacent retarder L1 for the left eye and a part of light emitted from the pixel line L for the left eye passes through an adjacent retarder R1 for the right eye.

A method for reducing such crosstalk has been proposed, for example, in PTL 1.

In a stereoscopic display device described in PTL 1, light blockers for blocking incident image light for the right eye and incident image light for the left eye are disposed on one side of a retarder along boundaries between retarders for the right eye (first polarizing regions) and retarders for the left eye (second polarizing regions). To be specific, the stereoscopic display device has the following structure.

FIG. 7 is a schematic view illustrating the structure of the main part of the stereoscopic display device described in PTL 1.

As illustrated in FIG. 7, in a stereoscopic display device 200, a retarder 180 has first polarizing regions 181 and second polarizing regions 182. As illustrated in FIG. 7, the position and size of each of the first polarizing regions 181 and each of the second polarizing regions 182 of the retarder 180 correspond to the position and size of each of image generation regions 162 for the right eye and each of image generation regions 164 for the left eye of an image generating section 160.

Therefore, while the stereoscopic display device 200 is in use, image light for the right eye that has passed through each of the image generation regions 162 for the right eye is incident on a corresponding one of the first polarizing regions 181 and image light for the left eye that has passed through each of the image generation regions 164 for the left eye is incident on a corresponding one of the second polarizing regions 182.

A light blocker 190 is disposed on a surface of the retarder 180 facing an image display section 130 along the boundary between each of the first polarizing regions 181 and an adjacent one of the second polarizing regions 182. The light blocker 190 absorbs and blocks a part of image light for the left eye that should enter the second polarizing region 182 adjacent to the first polarizing region 181 of the retarder 180 but enters the first polarizing region 181 across the boundary. The light blocker 190 also absorbs and blocks a part of image light for the right eye that should enter the first polarizing region 181 adjacent to the second polarizing region 182 of the retarder 180 but enters the second polarizing region 182 across the boundary. Thus, by disposing the light blockers 190 along the boundaries of the retarder 180, crosstalk between image light for the right eye and image light for the left eye that are emitted from the stereoscopic display device 200 can be reduced.

CITATION LIST

Patent Literature

PTL 1: Japanese Unexamined Patent Application Publication No. 2008-257207 (published on Oct. 23, 2008)

SUMMARY OF INVENTION

Technical Problem

However, the stereoscopic display device 200 disclosed in PTL 1 has a problem in that, because the light blockers 190 are disposed on one side of the retarder 180, the brightness of a planar image displayed by the stereoscopic display device 200 is considerably reduced due to the presence of the light blockers 190.

An object of the present invention, which has been achieved in order to address the problem, is to provide a display device and a display method for the display device with which a three-dimensional stereoscopic image with reduced crosstalk can be displayed, and to provide a display device and a display method for the display device with which a three-dimensional stereoscopic image with reduced crosstalk and a two-dimensional planar image with high brightness can be displayed.

Means for Solving the Problems

In order to solve the problem described above, a display device according to the present invention is a display device in which pixels are arranged in a matrix pattern, the display device being capable of displaying a stereoscopic image by displaying an image for the right eye and an image for the left eye on the pixels, wherein, in a case where the pixels on which the image for the right eye is displayed are defined as pixels for the right eye and the pixels on which the image for the left eye is displayed are defined as pixels for the left eye, achromatic pixels for displaying an achromatic color are disposed between at least some of the pixels for the right eye and at least some of the pixels for the left eye.

In order to solve the problem described above, a display method according to the present invention is a display method for displaying a stereoscopic image on a display device in which pixels are arranged in a matrix pattern by displaying an image for the right eye and an image for the left eye on the pixels, wherein an achromatic color is displayed between the pixels on which the image for the right eye is displayed and the pixels on which the image for the left eye is displayed.

With the structure or the method described above, when a stereoscopic image is displayed on the display device, the achromatic pixels for displaying an achromatic color are disposed between at least some of the pixels for the right eye and at least some of the pixels for the left eye. Therefore, image light for the right eye emitted from the pixels for the right eye and image light for the left eye emitted from the pixel for the left eye are prevented from being mixed together, so that occurrence of crosstalk can be prevented.

In a case where the display device displays a two-dimensional planar image, the achromatic pixels, which display an achromatic color when the display device displays a three-dimensional stereoscopic image, also perform display as normal pixels. Accordingly, decrease in brightness can be prevented.

Thus, the display device can display a three-dimensional stereoscopic image with reduced crosstalk and a two-dimensional planar image with high brightness.

Advantages

The display device according to the present invention is a display device in which pixels are arranged in a matrix pattern, the display device being capable of displaying a stereoscopic image by displaying an image for the right eye and an image for the left eye on the pixels, wherein, in a case where the pixels on which the image for the right eye is displayed are defined as pixels for the right eye and the pixels on which the image for the left eye is displayed are defined as pixels for the left eye, achromatic pixels for displaying an achromatic color are disposed between at least some of the pixels for the right eye and at least some of the pixels for the left eye.

The display method according to the present invention is a display method for displaying a stereoscopic image on a display device in which pixels are arranged in a matrix pattern by displaying an image for the right eye and an image for the left eye on the pixels, wherein an achromatic color is displayed between the pixels on which the image for the right eye is displayed and the pixels on which the image for the left eye is displayed.

Therefore, it is possible to provide a display device and a display method for the display device with which a three-dimensional stereoscopic image with reduced crosstalk and a two-dimensional planar image with high brightness can be displayed.

DESCRIPTION OF EMBODIMENTS

Hereinafter, embodiments of the present invention will be described in detail.

[First Embodiment]

First, referring to FIGS. 1 and 2, the present embodiment will be described. A display device according to the present embodiment displays a two-dimensional planar image and a three-dimensional stereoscopic image.

Figure 1:
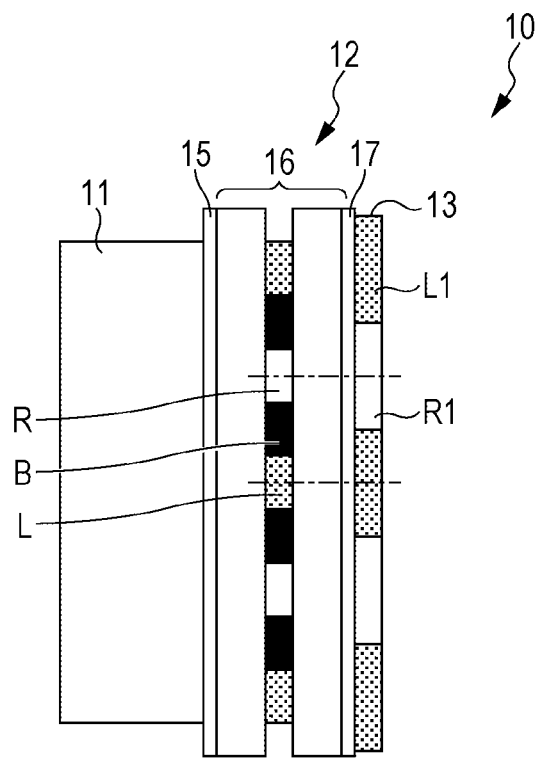
FIG. 1 is a schematic view illustrating the structure of the main part of a display device according to a first embodiment of the present invention.

FIG. 1 is a schematic view illustrating the structure of the main part of the display device according to the present embodiment.

As illustrated in FIG. 1, a display device 10 includes a backlight 11, an image display section 12, and a retarder 13, which are arranged in this order. The image display section 12 includes a back polarizer 15, an image generating section 16, and a front polarizer 17. A viewer views an image displayed on the display device 10 from the right side of the retarder 13 in FIG. 1.

The backlight 11 is disposed on the farthest side of the display device 10 as seen from a viewer. While the display device 10 is in use, the backlight 11 emits unpolarized white light toward a surface of the back polarizer 15.

In the present embodiment, the backlight 11 emits unpolarized white light toward a surface of the back polarizer 15. However, this is not a limitation. The backlight 11 may emit light having a polarization axis parallel to the transmission axis of the back polarizer 15 toward a surface of the back polarizer 15.

In the present embodiment, the backlight 11, which is a surface light source, is used as a light source. Instead of a surface light source, for example, a combination of a point light source and a light-gathering lens may be used. An example of the light-gathering lens is a Fresnel lens sheet. Further alternatively, a combination of a point light source (LED) and a diffuser or a combination of a point light source (LED) and a light guide may be used.

The back polarizer 15 is disposed on a surface of the image generating section 16 facing the backlight 11. The back polarizer 15 has a transmission axis and an absorbing axis perpendicular to the transmission axis. When unpolarized light emitted from the backlight 11 is incident on the back polarizer 15, the back polarizer 15 transmits a part of the unpolarized light having a polarization axis parallel to the transmission axis and blocks a part of the unpolarized light having a polarization axis parallel to the absorbing axis.

The image generating section 16 is disposed between the back polarizer 15 and the front polarizer 17, and an image is generated in accordance with the display mode of the display device 10. The display modes of the display device 10 include a mode in which the display device 10 displays a three-dimensional stereoscopic image and a mode in which the display device 10 displays a two-dimensional planar image.

First, a case where the display device 10 displays a three-dimensional stereoscopic image will be described. The display device 10 displays a three-dimensional stereoscopic image by displaying an image for the right eye and an image for the left eye on pixels that are arranged in a matrix pattern.

As illustrated in FIG. 1, in the image generating section 16, pixel lines R for the right eye, which display an image for the right eye, and pixel lines L for the left eye, which display an image for the left eye, are alternately arranged in the vertical direction with black pixel lines B, which display a black image, therebetween. Light that has passed through the back polarizer 15 is incident on pixel lines R for the right eye and pixel lines L for the left eye of the image generating section 16. Then, light passing through the pixel lines R for the right eye becomes image light for the right eye and light passing through the pixel lines L for the left eye becomes image light for the left eye. Light that is incident on the black pixel lines B is blocked.

The front polarizer 17 is disposed on the viewer's side of the image generating section 16. Image light for the right eye that has passed through the pixel lines R for the right eye and image light for the left eye that has passed through the pixel lines L for the left eye are incident on the front polarizer 17. Then, the front polarizer 17 transmits a part of the image light having a polarization axis parallel to the transmission axis and absorbs a part of the image light having a polarization axis parallel to the absorbing axis.

The retarder 13 includes retarders L1 for the left eye and retarders R1 for the right eye. The retarders L1 for the left eye and the retarders R1 for the right eye are alternately arranged in the vertical direction. As illustrated in FIG. 1, the positions and sizes of the retarders L1 for the left eye and the retarders R1 for the right eye of the retarder 13 correspond to the positions and sizes of the pixel lines R for the right eye, the black pixel lines B, and the pixel lines L for the left eye of the image generating section 16. To be specific, the width of one of the retarders L1 for the left eye or the retarders R1 for the right eye corresponds to the width of two of the pixel lines R, B, or L. Each of the retarders L1 for the left eye is disposed so as to face a corresponding one of the pixel lines L for the left eye and parts of two black pixel lines B that are arranged on both sides of the pixel line L for the left eye. Each of the retarders R1 for the right eye is disposed so as to face a corresponding one of the pixel lines R for the right eye and parts of two black pixel lines B that are arranged on both sides of the pixel line R for the right eye. In plan view, the center of each of the retarders L1 for the left eye in the width direction coincides with the center of a corresponding one of the pixel lines L for the left eye, and the center of each of the retarders R1 for the right eye in the width direction coincides with the center of a corresponding one of the pixel lines R for the right eye.

Image light for the right eye that has passed through each of the pixel lines R for the right eye is incident on a corresponding one of the retarders R1 for the right eye, and image light for the left eye that has passed through each of the pixel lines L for the left eye is incident on a corresponding one of the retarders L1 for the left eye. Because each of the retarders L1 for the left eye is disposed so as to face a corresponding one of the pixel lines L for the left eye and parts of two black pixel lines B that are arranged on both sides of the pixel line L for the left eye, the amount of image light for the left eye that is emitted from the pixel line L for the left eye and that is incident on adjacent one of the retarders R1 for the right eye beyond the boundary between the retarder L1 for the left eye and the retarder R1 for the right eye is small. Because each of the retarders R1 for the right eye is disposed so as to face a corresponding one of the pixel lines R for the right eye and parts of two black pixel lines B that are arranged on both sides of the pixel lines R for the right eye, the amount of image light for the right eye that is emitted from the pixel line R for the right eye and that is incident on adjacent one of the retarders L1 for the left eye beyond the boundary between the retarder R1 for the right eye and the retarder L1 for the left eye is small. Thus, the amounts of image light for the right eye and image light for the left eye that are emitted from the display device 10 and that are not mixed with each other are small, so that crosstalk is reduced.

Each of the retarders R1 for the right eye transmits incident image light for the right eye without rotating the polarization axis. Each of the retarders L1 for the left eye rotates the polarization axis of incident image light for the left eye to a direction perpendicular to the polarization axis of image light for the right eye, which is incident on the retarder R1 for the right eye. Therefore, the polarization axis of image light for the right eye that has passed through the retarder R1 for the right eye and the polarization axis of image light for the left eye that has passed through the retarder L1 for the left eye are perpendicular to each other. As the retarder R1 for the right eye, for example, a transparent glass or resin is used. As the retarder L1 for the left eye, for example, a half-wave plate having an optical axis extending at an angle of 45 degrees with respect to the polarization axis of incident image light for the left eye is used.

In the present embodiment, the retarder R1 for the right eye does not rotate the polarization axis of incident image light for the right eye, and the retarder L1 for the left eye rotates the polarization axis of incident image light for the left eye to a direction perpendicular to the polarization axis of image light for the right eye, which is incident on the retarder R1 for the right eye. However, this is not a limitation. It is only necessary that the direction of the polarization axis of image light for the right eye that has passed through the retarder R1 for the right eye be different from the direction of the polarization axis of image light for the left eye that has passed through the retarder L1 for the left eye.

It is not necessary that both of the retarders R1 for the right eye and the retarders L1 for the left eye be provided. Instead, only one of them may be provided.

Figure 2:
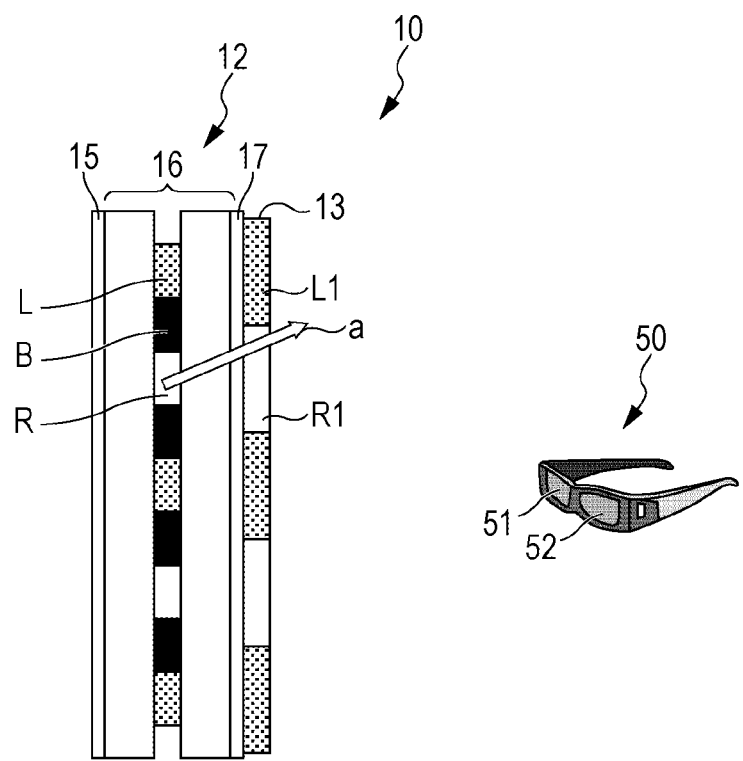
FIG. 2 is a schematic view illustrating the display device according to the first embodiment of the present invention in use.

FIG. 2 is a schematic view illustrating the display device according to the present embodiment in use. In FIG. 2, the backlight 11, which is a light source, is not illustrated.

As illustrated in FIG. 2, when viewing a three-dimensional stereoscopic image on the display device 10, a viewer wears polarizing glasses 50 and views image light for the right eye and image light for the left eye, which are projected from the display device 10. The polarizing glasses 50 include an image filter 51 for the right eye and an image filter 52 for the left eye, which are located at positions respectively corresponding to the right eye and the left eye of a viewer when the viewer wears the polarizing glasses 50. The image filter 51 for the right eye and the image filter 52 for the left eye, which are fixed to a frame of the polarizing glasses 50, are polarizing lenses that have transmission axes extending in specific directions that are different from each other.

The image filter 51 for the right eye is a polarizer having a transmission axis extending in the same direction as image light for the right eye that has passed through the retarder R1 for the right eye and having an absorbing axis perpendicular to the transmission axis. The image filter 52 for the left eye is a polarizer having a transmission axis extending in the same direction as image light for the left eye that has passed through the retarder L1 for the left eye and having an absorbing axis perpendicular to the transmission axis. As each of the image filter 51 for the right eye and the image filter 52 for the left eye, for example, a polarizing lens coated with a polarizing film made by uniaxially stretching a dichromatic-dye-impregnated film is used.

When viewing a stereoscopic image on the display device 10, a viewer wears the polarizing glasses 50 as described above and views the display device 10 within a range of directions in which image light for the right eye and image light for the left eye that have passed through the retarders R1 for the right eye and the retarders L1 for the left eye of the retarder 13 are emitted. By doing so, the viewer can view only image light for the right eye with the right eye and only image light for the left eye with the left eye. Therefore, the viewer can recognize the image light for the right eye and the image light for the left eye as a three-dimensional stereoscopic image.

Heretofore, a case where the display device 10 displays a three-dimensional stereoscopic image has been described.

Figure 7:
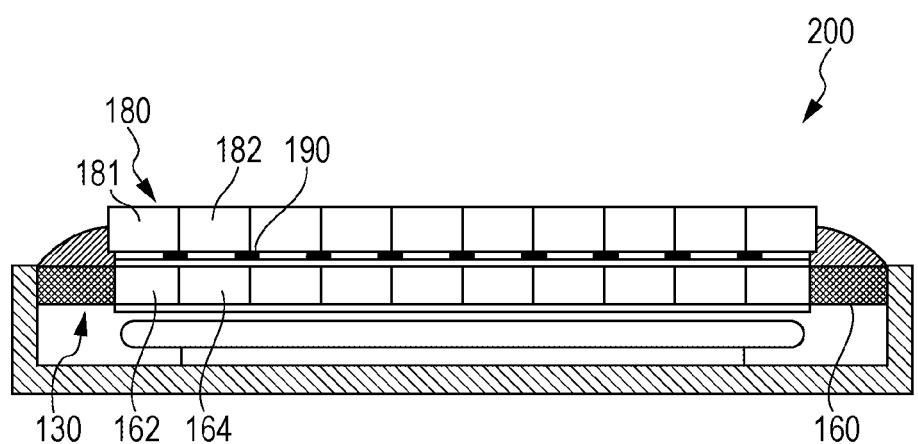
FIG. 7 is a schematic view illustrating the structure of the main part of a stereoscopic display device described in PTL 1.

In a case where the display device 10 displays a two-dimensional planar image, the black pixel lines B, which display a black image when the display device 10 displays a three-dimensional stereoscopic image, perform display as ordinary pixel lines. Thus, a problem with the related-art technology illustrated in FIG. 7, in that brightness decreases, does not occur.

In the case where the display device 10 according to the present embodiment displays a three-dimensional stereoscopic image, each of the black pixel lines B is positioned between a corresponding one of the pixel lines R for the right eye and a corresponding one of the pixel lines L for the left eye; and the retarders L1 and R1 for the left and right eyes, each having a width of two pixels, are positioned so as to respectively correspond to the pixel lines R and L. Thus, for example, light emitted from the pixel line R for the right eye even at more than a certain viewing angle with respect to the front direction (for example, arrow a in FIG. 2) passes through the retarder R1 for the right eye and the image filter 51 for the right eye of the polarizing glasses 50, and reaches the right eye of a viewer. Light emitted from the pixel line L for the left eye even at more than a certain viewing angle with respect to the front direction passes through the retarder L1 for the left eye and the image filter 52 for the left eye of the polarizing glasses 50, and reaches the left eye of the viewer. Accordingly, crosstalk does not occur. In the case where the display device 10 displays a two-dimensional planar image, the black pixel lines B, which display a black image when the display device 10 displays a three-dimensional stereoscopic image, also perform display as normal pixel lines. Accordingly, decrease in brightness does not occur.

Therefore, the display device 10 according to the present embodiment can display a three-dimensional stereoscopic image with reduced crosstalk and a two-dimensional planar image with high brightness.

In the display device 10 according to the present embodiment, the black pixel lines B, which display a black image, are disposed between the pixel lines R for the right eye, which display an image for the right eye, and the pixel lines L for the left eye, which display an image for the left eye. However, this is not a limitation. For example, achromatic pixel lines, such as white pixel lines that display a white image, may be disposed between the pixel lines R for the right eye and the pixel lines L for the left eye.

In the display device 10 according to the present embodiment, the image display section 12 includes the back polarizer 15 and the front polarizer 17. However, the polarizers may be omitted depending on the type of the display device 10.

In the display device 10 according to the present embodiment, the backlight 11 is provided as a light source. However, the backlight 11 may be omitted depending on the type of the display device 10.

[Second Embodiment]

Figure 3:
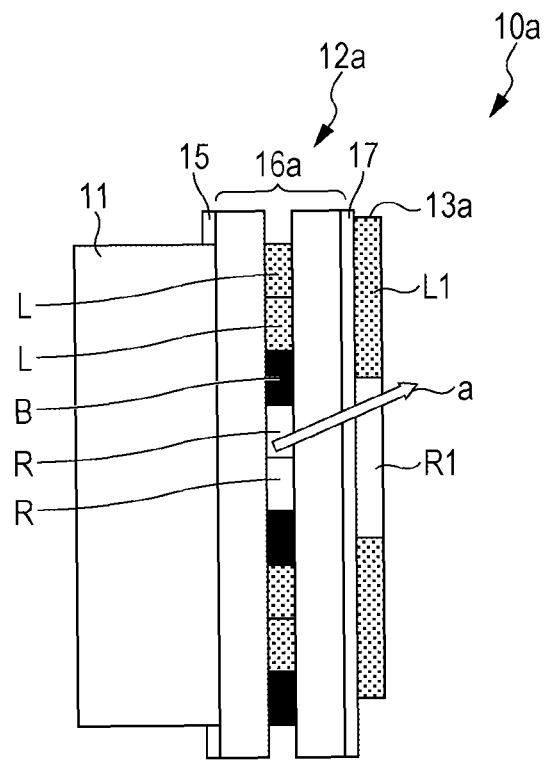
FIG. 3 is a schematic view illustrating the structure of the main part of a display device according to a second embodiment of the present invention.

Referring to FIG. 3, a display device according to an embodiment of the present invention will be described. For convenience of description, members having the same functions as the members illustrated in the drawings used in the description of the first embodiment will be denoted by the same numerals and descriptions thereof will be omitted.

FIG. 3 is a schematic view illustrating the structure of the main part of the display device according to the present embodiment.

As illustrated in FIG. 3, a display device 10a includes a backlight 11, an image display section 12a, and a retarder 13a, which are arranged in this order. The image display section 12a includes a back polarizer 15, an image generating section 16a, and a front polarizer 17. A viewer views an image displayed on the display device 10a from the right side of the retarder 13a in FIG. 3.

The image generating section 16a is disposed between the back polarizer 15 and the front polarizer 17, and an image is generated in accordance with the display mode of the display device 10a. The display modes of the display device 10a include a mode in which the display device 10a displays a three-dimensional stereoscopic image and a mode in which the display device 10a displays a two-dimensional planar image.

First, a case where the display device 10a displays a three-dimensional stereoscopic image will be described.

As illustrated in FIG. 3, in the case where the display device 10a display a three-dimensional stereoscopic image, in the image generating section 16a, pairs of adjacent pixel lines R for the right eye, which display an image for the right eye, and pairs of adjacent pixel lines L for the left eye, which display an image for the left eye, are alternately arranged in the vertical direction with black pixel lines B, which display a black image, therebetween. Light that has passed through the back polarizer 15 is incident on pixel lines R for the right eye and pixel lines L for the left eye of the image generating section 16a. Then, light passing through the pixel lines R for the right eye becomes image light for the right eye and light passing through the pixel lines L for the left eye becomes image light for the left eye. Light that is incident on the black pixel lines B is blocked.

The retarder 13a includes retarders L1 for the left eye and retarders R1 for the right eye. The retarders L1 for the left eye and the retarders R1 for the right eye are alternately arranged in the vertical direction. As illustrated in FIG. 3, the positions and sizes of the retarders L1 for the left eye and the retarders R1 for the right eye of the retarder 13a correspond to the positions and sizes of the pixel lines R for the right eye, the black pixel lines B, and the pixel lines L for the left eye of the image generating section 16a. To be specific, the width of one of the retarders L1 for the left eye or the retarders R1 for the right eye corresponds to the width of three of the pixel lines R, B, or L. Each of the retarders L1 for the left eye is disposed so as to face a corresponding pair of adjacent pixel lines L for the left eye and parts of two black pixel lines B that are arranged on both sides of the pair of adjacent pixel lines L for the left eye. Each of the retarders R1 for the right eye is disposed so as to face a corresponding pair of adjacent pixel lines R for the right eye and parts of two black pixel lines B that are arranged on both sides of the pair of adjacent pixel lines R for the right eye. With this structure, as compared with the first embodiment, the number of black pixel lines B is reduced, so that decrease in the resolution when the display device 10a displays a three-dimensional stereoscopic image can be reduced. With the first embodiment, the vertical resolution in the case where a three-dimensional stereoscopic image is displayed is ¼ of that of the case where a two-dimensional planar image is displayed. In contrast, with the present embodiment, the vertical resolution in the case where a three-dimensional stereoscopic image is displayed is ⅓ of that of the case where a two-dimensional planar image is displayed, so that decrease in the resolution can be reduced.

Image light for the right eye that has passed through each of the pixel lines R for the right eye is incident on a corresponding one of the retarders R1 for the right eye, and image light for the left eye that has passed through each of the pixel lines L for the left eye is incident on a corresponding one of the retarders L1 for the left eye.

Each of the retarders R1 for the right eye transmits incident image light for the right eye without rotating the polarization axis. Each of the retarders L1 for the left eye rotates the polarization axis of incident image light for the left eye to a direction perpendicular to the polarization axis of image light for the right eye, which is incident on the retarder R1 for the right eye. Therefore, the polarization axis of image light for the right eye that has passed through the retarder R1 for the right eye and the polarization axis of image light for the left eye that has passed through the retarder L1 for the left eye are perpendicular to each other.

A viewer wears the polarizing glasses 50 illustrated in FIG. 2 and views the display device 10a. The viewer can view only image light for the right eye with the right eye and only image light for the left eye with the left eye. Therefore, the viewer can recognize the image light for the right eye and the image light for the left eye as a three-dimensional stereoscopic image.

Heretofore, a case where the display device 10a displays a three-dimensional stereoscopic image has been described.

In a case where the display device 10a displays a two-dimensional planar image, the black pixel lines B, which display black when the display device 10a displays a three-dimensional stereoscopic image, perform display as ordinary pixel lines. Thus, a problem with the related-art technology illustrated in FIG. 7, in that brightness decreases, does not occur.

In the case where the display device 10a according to the present embodiment displays a three-dimensional stereoscopic image, each of the black pixel lines B is positioned between a pair of adjacent pixel lines R for the right eye and a pair of adjacent pixel lines L for the left eye; and the retarders L1 and R1 for the left and right eyes, each having a width of three pixels, are positioned so as to respectively correspond to the pair pixel lines R and the pair of pixel lines L. Thus, for example, light emitted from the pixel line R for the right eye even at more than a certain viewing angle with respect to the front direction (for example, arrow a in FIG. 3) passes through the retarder R1 for the right eye and the image filter 51 for the right eye of the polarizing glasses 50, and reaches the right eye of a viewer. Light emitted from the pixel line L for the left eye even at more than a certain viewing angle with respect to the front direction passes through the retarder L1 for the left eye and the image filter 52 for the left eye of the polarizing glasses 50, and reaches the left eye of the viewer. Accordingly, crosstalk does not occur. Because each of the black pixel lines B is disposed between a pair of adjacent pixel lines R for the right eye and a pair of adjacent pixel lines L for the left eye, the number of black pixel lines B is reduced, so that decrease in the resolution can be reduced. In the case where the display device 10a displays a two-dimensional planar image, the black pixel lines B, which display black when the display device 10a displays a three-dimensional stereoscopic image, also perform display as normal pixel lines. Accordingly, decrease in brightness does not occur.

Thus, the display device 10a according to the present embodiment can display a three-dimensional stereoscopic image with reduced crosstalk and a two-dimensional planar image with high brightness.

In the present embodiment, each of the black pixel lines B is disposed between a pair of adjacent pixel lines R for the right eye and a pair of adjacent pixel lines L for the left eye. However, this is not a limitation and this structure may be modified as appropriate. For example, each of the black pixel lines B may be disposed between a group of three pixel lines R for the right eye and a group of three pixel lines L for the left eye.

[Third Embodiment]

Figure 4:
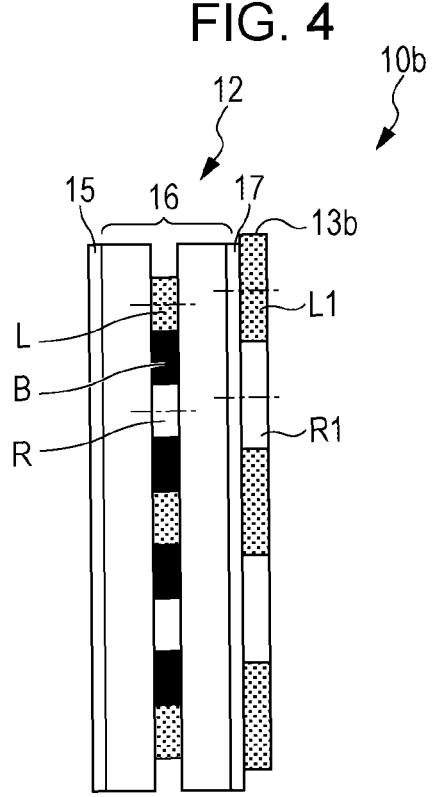
FIG. 4 is a schematic view illustrating the structure of the main part of a display device according to a third embodiment of the present invention.
Figure 5:
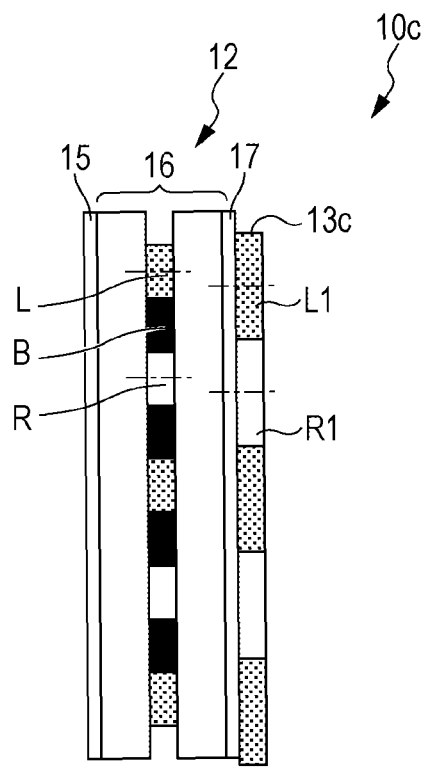
FIG. 5 is a schematic view illustrating the structure of the main part of the display device according to the third embodiment of the present invention.
Figure 6:
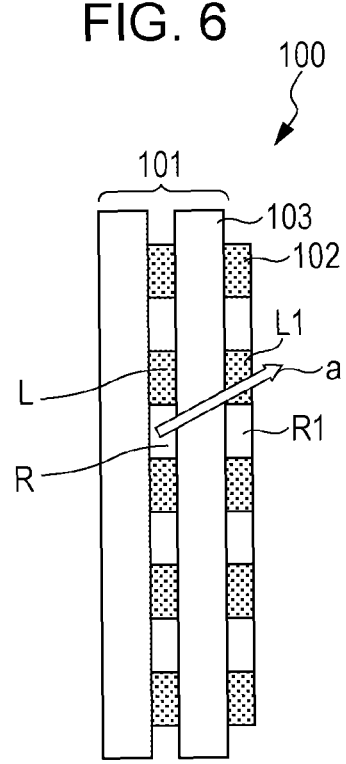
FIG. 6 is a schematic view illustrating the structure of the main part of an existing stereoscopic display device.

Referring to FIGS. 4 to 5, a display device according to another embodiment of the present invention will be described.

For convenience of description, members having the same functions as the members illustrated in the drawings used in the description of the first embodiment will be denoted by the same numerals and descriptions thereof will be omitted.

In the display device 10 according to the first embodiment, in plan view, the center of each of the retarder L1 for the left eye in the width direction coincides with the center of a corresponding one of the pixel lines L for the left eye, and the center of each of the retarder R1 for the right eye in the width direction coincides with the center of a corresponding one of the pixel lines R for the right eye.

FIG. 4 is a schematic view illustrating the structure of the main part of the display device according to the present embodiment.

As illustrated in FIG. 4, in a display device 10b according to the present embodiment, a retarder 13b includes retarders L1 for the left eye and retarders R1 for the right eye. The retarders L1 for the left eye and the retarders R1 for the right eye are alternately arranged in the vertical direction. As illustrated in FIG. 4, the positions and sizes of the retarders L1 for the left eye and the retarders R1 for the right eye of the retarder 13b correspond to the positions and sizes of the pixel lines R for the right eye, the black pixel lines B, and the pixel lines L for the left eye of the image generating section 16. To be specific, the width of one of the retarders L1 for the left eye or the retarders R1 for the right eye corresponds to the width of two of the pixel lines R, B, or L. Each of the retarders L1 for the left eye is disposed so as to face a corresponding one of the pixel lines L for the left eye and parts of two black pixel lines B that are arranged on both sides of the pixel line L for the left eye. Each of the retarders R1 for the right eye is disposed so as to face a corresponding one of the pixel lines R for the right eye and parts of two black pixel lines B that are arranged on both sides of the pixel line R for the right eye. In plan view, the center of each of the retarders L1 for the left eye in the width direction is located above the center of a corresponding one of the pixel lines L for the left eye, and the center of each of the retarders R1 for the right eye in the width direction is located above the center of a corresponding one of the pixel lines R for the right eye in the width direction. With this structure, crosstalk can be effectively prevented in a direction having a certain degree of upward angle with respect to the front direction.

(First Modification)

Referring to FIG. 5, a modification of the present embodiment will be described.

For convenience of description, members having the same functions as the members illustrated in the drawings used in the description of the third embodiment will be denoted by the same numerals and descriptions thereof will be omitted.

FIG. 5 is a schematic view illustrating the structure of the main part of a display device according to the present modification.

As illustrated in FIG. 5, in a display device 10c according to the present embodiment, a retarder 13c includes retarders L1 for the left eye and retarders R1 for the right eye. The retarders L1 for the left eye and the retarders R1 for the right eye are alternately arranged in the vertical direction. As illustrated in FIG. 5, the positions and sizes of the retarders L1 for the left eye and the retarders R1 for the right eye of the retarder 13c correspond to the positions and sizes of the pixel lines R for the right eye, the black pixel lines B, and the pixel lines L for the left eye of the image generating section 16. To be specific, the width of one of the retarders L1 for the left eye or the retarders R1 for the right eye corresponds to the width of two of the pixel lines R, B, or L. Each of the retarders L1 for the left eye is disposed so as to face a corresponding one of the pixel lines L for the left eye and parts of two black pixel lines B that are arranged on both sides of the pixel line L for the left eye. Each of the retarders R1 for the right eye is disposed so as to face a corresponding one of the pixel lines R for the right eye and parts of two black pixel lines B that are arranged on both sides of the pixel line R for the right eye. In plan view, the center of each of the retarders L1 for the left eye in the width direction is located below the center of a corresponding one of the pixel lines L for the left eye in the width direction, and the center of each of the retarders L1 for the right eye is located below the center of a corresponding one of the pixel lines L for the right eye. With this structure, crosstalk can be effectively prevented in a direction having a certain degree of downward angle with respect to the front direction.

In order to solve the aforementioned problem, in the display device according to the present invention, it is preferable that the achromatic color be black.

With this structure, increase in black luminance when displaying a stereoscopic image can be suppressed, so that decrease in the contrast of an image can be suppressed.

Moreover, electric power consumption of a normally black display device can be reduced.

In order to solve the aforementioned problem, in the display device according to the present invention, it is preferable that the pixels for the right eye be arranged along a stripe and the pixels for the left eye be arranged along a stripe, and a retarder be arranged along a stripe so as to correspond to the arrangements of the pixels.

With this structure, in a case where retarders are disposed so as to correspond to both of the pixels for the right eye and the pixels for the left eye, image light for the right eye emitted from the pixels for the right eye is incident on a retarder corresponding to the pixels for the right eye and image light for the left eye emitted from the pixels for the left eye is incident on a retarder corresponding to the pixels for the left eye.

In a case where a retarder is disposed so as to correspond to one of the pixels for the right eye and the pixels for the left eye, image light emitted from the pixels over which the retarder is disposed is incident on the corresponding retarder.

Accordingly, parallax images can be provided to a viewer.

In order to solve the aforementioned problem, in the display device according to the present invention, it is preferable that the stripe of the pixels for the right eye and the stripe of the pixels for the left eye be each provided in a plurality, and stripes of the achromatic pixels be each provided between a corresponding one of the stripes of the pixels for the right eye and a corresponding one of the stripes of the pixels for the left eye.

With this structure, stripes of the achromatic pixels are provided between the stripes of the pixels for the right eye and the stripes of the pixels for the left eye. Therefore, it is possible to reliably prevent image light for the right eye emitted from the pixels for the right eye from being incident on a retarder corresponding to the pixels for the left eye and prevent image light for the left eye emitted from the pixels for the left eye from being incident on a retarder corresponding to the pixels for the right eye. Accordingly, occurrence of crosstalk can be prevented.

In order to solve the aforementioned problem, in the display device according to the present invention, it is preferable that the stripe of the pixels for the right eye or the stripe of the pixels for the left eye be provided in a plurality between adjacent stripes of the achromatic pixels.

With this structure, the stripe of the pixels for the right eye or the stripe of the pixels for the left eye is provided in a plurality between adjacent stripes of the achromatic pixels. Therefore, the number of stripes of the achromatic pixels can be reduced, so that decrease in the resolution can be reduced.

In order to solve the aforementioned problem, in the display device according to the present invention, it is preferable that the width of the stripe of the retarder be greater than the width of the stripe of corresponding pixels.

With this structure, the width of the stripe of the retarder is greater than the width of the stripe of corresponding pixels. Therefore, the amount of image light that is emitted from the stripe of the pixels corresponding to the stripe of the retarder and that is incident on the stripe of another retarder can be reduced, so that occurrence of crosstalk can be reduced.

In order to solve the aforementioned problem, in the display device according to the present invention, it is preferable that the width of the stripe of the retarder be twice the width of the stripe of corresponding pixels.

With this structure, the width of the stripe of the retarder is twice the width of the stripe of corresponding pixels. Therefore, in a case where the stripe of the achromatic pixels is disposed between the stripe of the pixels for the right eye and the stripe of the pixels for the left eye, incidence of image light emitted from pixels corresponding to the retarder on another retarder can be suppressed, so that occurrence of crosstalk can be reduced.

In order to solve the aforementioned problem, in the display device according to the present invention, it is preferable that the width of the stripe of the retarder be three times the width of the stripe of corresponding pixels.

With this structure, the width of the stripe of the retarder is three times the width of the stripe of corresponding pixels. Therefore, in a case where a pair of stripes of pixels for the right eye or a pair of pixels for the left eye are disposed between adjacent stripes of the achromatic pixels, the amount of image light that is emitted from the pixels corresponding to the retarder and that is incident on another retarder can be reduced, so that occurrence of crosstalk can be reduced. Moreover, the number of achromatic pixels can be reduced, so that decrease in the resolution can be reduced.

In order to solve the aforementioned problem, in the display device according to the present invention, it is preferable that, in plan view, the center of the stripe of the retarder in the width direction coincide with the center of the stripe of corresponding pixels in the width direction.

With this structure, in plan view, the center of the stripe of the retarder in the width direction coincides with the center of the stripe of corresponding pixels in a width direction. Therefore, the amount of crosstalk that occurs in the front direction of the display device is small.

In order to solve the aforementioned problem, in the display device according to the present invention, it is preferable that, in plan view, the center of the stripe of the retarder in the width direction do not coincide with the center of the stripe of corresponding pixels in the width direction.

With this structure, in a case where the center of the stripe of the retarder in the width direction is, for example, above the center of the stripe of corresponding pixels, the amount of crosstalk viewed in a direction having an upward angle with respect to the front direction of the display device is reduced.

In a case where the center of the stripe of the retarder in the width direction is below the center of the stripe of corresponding pixels, the amount of crosstalk viewed in a direction having a downward angle with respect to the front direction of the display device is reduced.

The present invention is not limited to the embodiments described above, and can be modified within the scope described in the claims, and embodiments that are obtained by combining technologies described in different embodiments are within the technical scope of the present invention.

INDUSTRIAL APPLICABILITY

The present invention can be used for display devices for displaying a three-dimensional stereoscopic image.

REFERENCE SIGNS LIST 10 display device
10a display device
10b display device
10c display device
11 backlight
12 image display section
12a image display section
13 retarder
13a retarder
13b retarder
13c retarder
15 back polarizer
16 image generating section
16a image generating section
17 front polarizer
50 polarizing glasses
51 image filter for the right eye
52 image filter for the left eye
B black pixel line
L pixel line for the right eye
R pixel line for the right eye
L1 retarder for the left eye
R1 retarder for the right eye

The invention claimed is:

1. A display device in which pixels are arranged in a matrix pattern, the display device being capable of displaying a stereoscopic image by displaying an image for a right eye and an image for a left eye on the pixels,
    wherein, in a case where the pixels on which the image for the right eye is displayed are defined as pixels for the right eye and the pixels on which the image for the left eye is displayed are defined as pixels for the left eye,
    wherein achromatic pixels for displaying an achromatic color are disposed between at least some of the pixels for the right eye and at least some of the pixels for the left eye,
    wherein the pixels for the right eye are arranged along a stripe and the pixels for the left eye are arranged along a stripe,
    wherein a retarder is arranged along a stripe so as to correspond to the arrangements of the pixels, and
    wherein, in a plan view, a center of the stripe of the retarder in a width direction does not coincide with a center of the stripe of corresponding pixels in a width direction.

2. The display device according to claim 1, wherein the achromatic color is black.

3. The display device according to claim 1, wherein the stripe of the pixels for the right eye and the stripe of the pixels for the left eye are each provided in a plurality, and
    wherein stripes of the achromatic pixels are each provided between a corresponding one of the stripes of the pixels for the right eye and a corresponding one of the stripes of the pixels for the left eye.

4. The display device according to claim 1, wherein the stripe of the pixels for the right eye or the stripe of the pixels for the left eye is provided in a plurality between adjacent stripes of the achromatic pixels.

5. The display device according to claim 1, wherein a width of the stripe of the retarder is greater than a width of the stripe of corresponding pixels.

6. The display device according to claim 1, wherein a width of the stripe of the retarder is twice a width of the stripe of corresponding pixels.

7. The display device according to claim 1, wherein a width of the stripe of the retarder is three times a width of the stripe of corresponding pixels.

8. A display method for displaying a stereoscopic image on a display device in which pixels are arranged in a matrix pattern by displaying an image for a right eye and an image for a left eye on the pixels,
    wherein an achromatic color is displayed between the pixels on which the image for the right eye is displayed and the pixels on which the image for the left eye is displayed,
    wherein the pixels for the right eye are arranged along a stripe and the pixels for the left eye are arranged along a stripe,
    wherein a retarder is arranged along a stripe so as to correspond to the arrangements of the pixels, and
    wherein, in a plan view, a center of the stripe of the retarder in a width direction does not coincide with a center of the stripe of corresponding pixels in a width direction.

* * * * *